US006284186B1

(12) United States Patent
Hansen

(10) Patent No.: US 6,284,186 B1
(45) Date of Patent: Sep. 4, 2001

(54) METHOD FOR USING RECYCLED GLASS AS A FILLER AND REINFORCEMENT IN MOLDED PLASTICS

(75) Inventor: Richard W. Hansen, Eagle, ID (US)

(73) Assignee: R & J Hansen, L.L.C., Salt Lake City, UT (US)

( * ) Notice: Subject to any disclaimer, the term of this patent is extended or adjusted under 35 U.S.C. 154(b) by 0 days.

(21) Appl. No.: 09/264,950

(22) Filed: Mar. 9, 1999

Related U.S. Application Data

(63) Continuation-in-part of application No. 08/967,718, filed on Nov. 10, 1997, now Pat. No. 5,935,510.
(60) Provisional application No. 60/036,197, filed on Jan. 21, 1997.

(51) Int. Cl.$^7$ ........................................................ B29B 7/00
(52) U.S. Cl. .................... 264/523; 264/310; 264/328.18; 264/349; 264/915; 264/917; 264/921
(58) Field of Search ..................................... 264/523, 310, 264/328.18, 349, 915, 917, 921

(56) References Cited

U.S. PATENT DOCUMENTS

| | | |
|---|---|---|
| 3,597,177 | 8/1971 | Davidoff . |
| 3,846,366 | 11/1974 | Wallace . |
| 3,854,267 | 12/1974 | Weiant et al. . |
| 3,976,608 | 8/1976 | Bucker et al. . |
| 4,013,616 | 3/1977 | Wallace . |
| 4,154,789 | 5/1979 | Delacoste . |
| 4,213,851 | 7/1980 | White et al. . |
| 4,564,491 | 1/1986 | Koestecki . |
| 4,796,820 | 1/1989 | Hansen . |
| 4,997,485 | 3/1991 | Lamoni . |
| 5,184,781 | 2/1993 | Andela . |
| 5,202,064 | * 4/1993 | Furusawa et al. ..................... 264/23 |
| 5,523,135 | 6/1996 | Shiwaku et al. . |
| 5,935,510 | * 8/1999 | Hansen .................................. 264/523 |

FOREIGN PATENT DOCUMENTS

96/2358   8/1996  (WO) .

OTHER PUBLICATIONS

"Summary of Markets for Recovered Glass," Office of Solid Waste, U.S. Environmental Protection Agency, (OS–305) (Dec. 1992).

"Markets for Recovered Glass," Office of Solid Waste, U.S. Environmental Protection Agency (OS–305) (Dec. 1992).

Paxton, Kip, "Mining Glass from the Waste Stream," Waste Glass Processing Center—A Tool for Economic Development, Institute of Materials Processing, Michigan Technological University, www.imp.mtu.edu/newdocs/wgpc.html) (Date unknown).

* cited by examiner

*Primary Examiner*—Jan H. Silbaugh
*Assistant Examiner*—Suzanne E McDowell
(74) *Attorney, Agent, or Firm*—Madson & Metcalf

(57) ABSTRACT

The use of comminuted, recycled glass powders as a filler in molded plastic parts is disclosed. The recycled glass powder has non-uniform, rounded edges and is free from contaminants such as grinding compounds, metals, inorganic, and organic waste materials. The recycled glass powder filler can be used with a variety of different thermoplastics and thermosetting plastics commonly used to in injection molding and blow molding of plastic parts.

17 Claims, No Drawings

METHOD FOR USING RECYCLED GLASS AS A FILLER AND REINFORCEMENT IN MOLDED PLASTICS

RELATED PATENT APPLICATION

This invention is a continuation-in-part of U.S. patent application Ser. No. 08/967,718 filed Nov. 10, 1997 entitled "Method for Using Recycled Glass as a Filler in Molded Plastics," U.S. Pat. No. 5,935,510 which claims the benefit of U.S. Provisional Patent Application Ser. No. 60/036,197 filed Jan. 1, 1997 entitled "Method for Using Recycled Glass as a Filler in Molded Plastics," which applications are incorporated herein by reference.

FIELD OF THE INVENTION

The present invention relates to the use of comminuted recycled glass as a filler and reinforcement in molded plastics.

BACKGROUND OF THE INVENTION

There is a continuing need in the art of manufacturing plastic parts to reduce the manufacturing costs while maintaining product quality. Many different types of plastic fillers have been proposed for use with molded plastics, but all have failed for one or more reasons. This is particularly true for rotational molded parts.

For instance, organic materials, such as crushed nut shells, produce harmful gasses at typical molding temperatures of 550° F. to 700° F. Sand has also been tried as a filler, but it does not mold well because it does not disperse evenly through out the plastic. Instead, sand tends to migrate to the inside of rotational molded parts. It does not bond well with the plastic and sheds quickly. Sand is also hard on the mixing equipment. Commercially available glass beads and whiskers are often used with injection molded plastics. They have been used with varying degrees of success in rotational molded plastics because the glass does not mix well and simply balls up on the inside of the rotating mold. As used herein, a plastic "filler" is an ingredient which has a cost substantially less than the cost of the plastic used to mold the product. As used herein, a plastic "reinforcement" is an ingredient which is included in the plastic to provide a desired property or characteristic to the molded product.

As mentioned above, specially manufactured glass has been used as an ingredient in injection and rotational molded plastic parts. For instance, commercially available glass fibers or whiskers, having a length of about ¼ inch, have been added to plastic to make the product tougher and to improve the yield stress. Manufactured glass beads (either solid or hollow) have also been used in injection and rotational molded plastics to improve to toughness and abrasion resistance of the product. However, the manufactured glass fibers and beads cost approximately the same as the plastic used to mold the product. The manufactured glass fibers and beads have been used solely to provide desired mechanical properties in the finished plastic product. They have not been used as a filler in plastic to reduce manufacturing costs.

It would be a significant advancement in the art to provide a true filler for molded plastic parts which can be used to lower the manufacturing cost of molded plastics. It would also be an advancement in the art to provide a filler for molded plastic parts which enhances certain mechanical properties of the part and functions as a reinforcement ingredient.

Such a filler for molded plastic parts is disclosed herein.

SUMMARY OF THE INVENTION

The present invention is directed to the use of comminuted, recycled glass powders as a filler in molded plastic parts. Suitable recycled glass powder is preferably free from contaminants, such as grinding compounds, metals, and waste materials, including organic and inorganic wastes. The recycled glass powder filler is preferably used with thermoplastic and thermosetting resins commonly used to in injection molding, extrusion molding, rotational molding, and blow molding of plastic parts. The comminuted recycled glass powder preferably has a particle size smaller than about 20 mesh, and preferably in the range from about 100 mesh to about 400 mesh, and smaller. Recycled glass powder as small as 1000 mesh can be successfully used according to the present invention.

Comminuted recycled glass powder can be added to plastic resin in injection molding applications in concentrations ranging from about 5% to more than 80% by weight, and preferably from 5% to 45% by weight. Because comminuted recycled glass powder costs substantially less than the cost of the raw resin used to manufacture plastic parts, the glass functions as a useful low-cost filler.

It has been found that injection molded glass filled plastic parts show excellent heat resistance compared to unfilled parts. The glass filled plastic parts also show good particle distribution, flex modulus, and abrasion resistance, lower thermal conductivity, improved toughness, durability, and creep resistance. The amount of glass powder filler in the plastic part can be tailored to provide the desired mechanical.

DESCRIPTION OF THE INVENTION

The present invention is directed to the use of comminuted recycled glass powders as a filler in molded plastic parts. The comminuted recycled glass powder preferably has a particle size smaller than about 20 mesh, and preferably in the range from about 100 mesh to about 400 mesh. Sizes as small as 600 to 1000 mesh can be used in some applications. Suitable recycled glass powder can be obtained as a byproduct from the methods and apparatus described in Wo 96/23587 entitled "Methods for Recycling Glass and Uses of Recycled Glass" and in application Serial No. 60/048,648 entitled "Apparatus for Comminuting Glass" filed Jun 5, 1997 (hereinafter "the '648 application"), which are incorporated herein by reference.

The disclosed methods and apparatus quickly and inexpensively convert waste glass into a form which can be safely handled. The processes involve "suspended attrition" in which the glass particles are suspended by rotating hammers and are caused to roll within a suspension chamber. Suitable recycled glass powder can also be obtained by introducing glass powder into a suspension chamber, described above, to round the glass powder edges. Preferably, the comminuted glass powder having non-uniform, rounded edges is free from contaminants such as grinding compounds, organic waste, metals, and inorganic waste materials.

By using multiple mesh screens of various sizes, recycled glass powder can be provided with a specific size or size range, typically ranging from 20 to 50 mesh to smaller than 400 mesh, and as small as 1000 mesh.

The comminuted recycled glass powder filler can be used with a variety of different thermoplastics including ABS (acrylonitrile-butadiene-styrene) resins, acrylic resins, chlorinated polyether resins, fluorocarbon resins, nylon (polyamide) resins, polycarbonate resins, polyethylene resins, polypropylene resins, polystyrene resins, polyurethane resins, polyphenolsulfide (PPS) resins, polyethersulfone (PES) resin, and vinyl resins. The recycled glass powder can also be used with a variety of different thermosetting plastics including epoxy and phenolic resins.

As used herein, the term "glass" encompasses all inorganic products which have cooled to a rigid solid without undergoing crystallization. Conventional, recyclable waste glass can be used, including plate glass, glass bottles and other molded glass shapes, and waste glass fibers. The term "glass" is also intended to include other glassy materials including ceramic materials such as porcelain. As used herein, comminuted recycled glass powder is intended to include comminuted manufactured glass powder, regardless of the origin of the glass.

It has been found that comminuted recycled glass powder can be used as a filler in molded plastic parts. Recycled glass is very inexpensive, currently costing about $0.15/pound, while typical plastic resin costs between $0.55/pound to $0.90/pound. Comminuted recycled glass powder can be added to plastic in concentrations up to about 80% by weight and higher. The actual concentration will depend upon the base resin used and the desired application. For instance, for heat insulation applications, high concentrations of glass powder, up to 80% and more, can be used. To obtain improved stiffness, smaller amounts of glass powder, from 7% to 10%, can be used. To obtain good abrasion resistance, from 30% to 45% glass powder can be used. Most applications will use glass powder at a concentration in the range from 5% to 45% by weight. Thus, it is possible to substantially reduce the manufacturing cost of plastic parts by using recycled glass powder as a filler.

Molded plastic parts containing glass powder filler possess improved heat resistance compared to unfilled parts. The glass filled plastic parts also show good particle distribution, flex modulus, and abrasion resistance, lower thermal conductivity, improved toughness, durability, and creep resistance. However, glass filled plastic parts tend to possess lower impact resistance compared to unfilled parts. The user must balance the desired improvements with the lower impact resistance. In practice, one would maximize the glass filler content while maintaining an acceptable impact resistance.

Advantageously, recycled glass powder can be used in a variety of different molding techniques, including injection molding, extrusion molding, and blow molding applications. The present invention is particularly useful in reducing the manufacturing costs of molded plastic parts.

An unexpected advantage of using the recycled glass powder as a filler in injection molded plastic parts is that the glass powder acts as a lubricant, facilitating the molding operation and lessening wear and abuse to the mechanical injection equipment.

The recycled glass powders can be used in conjunction with conventional mineral additives, such as talc, mica, calcium carbonate, and others. In many applications, the recycled glass powder can replace the mineral additives. Given that the mineral additives, depending on quality, currently sell for about $0.40 to $0.60 per pound, and the recycled glass powder currently sells for about $0.15 per pound, the recycled glass powder functions as a low-cost filler, even when replacing the mineral additives.

It should be appreciated that the methods of the present invention are capable of being incorporated in the form of a variety of embodiments, only a few of which have been illustrated and described above. The invention may be embodied in other forms without departing from its essential characteristics. The described embodiments are to be considered in all respects only as illustrative and not restrictive and the scope of the invention is, therefore, indicated by the appended claims rather than by the foregoing description. All changes which come within the meaning and range of equivalency of the claims are to be embraced within their scope.

What is claimed is:

1. A method for using recycled glass powder as a filler in molded plastic parts comprising:
   obtaining a quantity of uncontaminated, comminuted, recycled glass powder filler having non-uniform, rounded edges which has been comminuted without the use of grinding compounds, wherein the glass powder has a size less than about 20 mesh;
   combining the comminuted glass powder filler with a quantity of plastic resin; and
   molding a plastic part with the plastic resin and the comminuted glass powder filler, wherein the plastic part comprises up to 80% by weight comminuted glass powder filler, wherein said molding step is selected from injection molding, extrusion molding and blow molding.

2. A method for using recycled glass powder as defined in claim 1, wherein the plastic part comprises between 5% and 45% by weight comminuted glass powder filler.

3. A method for using recycled glass powder as defined in claim 1, wherein the plastic part comprises between 5% and 35% by weight comminuted glass powder filler.

4. A method for using recycled glass powder as defined in claim 1, wherein the comminuted glass powder filler has a particle size in the range from about 100 mesh to about 400 mesh.

5. A method for using recycled glass powder as defined in claim 1, wherein the comminuted glass powder filler has a particle size less than about 300 mesh.

6. A method for using recycled glass powder as defined in claim 1, wherein the plastic resin is a thermoplastic resin selected from ABS (acrylonitrile-butadiene-styrene) resins, acrylic resins, chlorinated polyether resins, fluorocarbon resins, nylon (polyamide) resins, polycarbonate resins, polyethylene resins, polypropylene resins, polystyrene resins, polyurethane resins, polyphenolsulfide (PPS) resins, polyethersulfone (PES) resins, and vinyl resins.

7. A method for using recycled glass powder as defined in claim 6, wherein the plastic part is molded by injection molding.

8. A method for using recycled glass powder as defined in claim 6, wherein the plastic part is molded by extrusion molding.

9. A method for using recycled glass powder as defined in claim 6, wherein the plastic part is molded by blow molding.

10. A method for using recycled glass powder as defined in claim 1, wherein the plastic resin is a thermosetting plastic resin selected from epoxy and phenolic resins.

11. A method for using recycled glass powder as defined in claim 10, wherein the plastic part is molded by injection molding.

12. A method for using recycled glass powder as fined in claim 10, wherein the plastic part is molded by extrusion molding.

13. A method for using recycled glass powder as defined in claim 10, wherein the plastic part is molded by blow molding.

14. A method for using recycled glass powder as defined in claim 1, wherein the plastic part is molded by injection molding.

15. A method for using recycled glass powder as defined in claim 1, wherein the plastic part is molded by extrusion molding.

16. A method for using recycled glass powder as defined in claim 1, wherein the plastic part is molded by blow molding.

17. A method for using recycled glass powder as defined in claim 1, wherein the comminuted glass powder filler is obtained using an apparatus which suspends glass particles and causes them to roll against each other.

* * * * *